COMBINED SYNTHETIC AND MULTIAPERTURE MAGNETIC-CORE SYSTEM

Filed Oct. 19, 1959

INVENTOR.
DOUGLAS C. ENGELBART
BY Lyon & Lyon
ATTORNEYS

INVENTOR.
DOUGLAS C. ENGELBART
BY Lyon & Lyon
ATTORNEYS

INVENTOR.
DOUGLAS C. ENGELBART
BY
Lyon & Lyon
ATTORNEYS

United States Patent Office 3,111,588
Patented Nov. 19, 1963

3,111,588

COMBINED SYNTHETIC AND MULTIAPERTURE MAGNETIC-CORE SYSTEM

Douglas C. Engelbart, Palo Alto, Calif., assignor to Stanford Research Institute, Palo Alto, Calif., a corporation of California Filed Oct. 19, 1959, Ser. No. 847,149
2 Claims. (Cl. 307—88)

This invention relates to magnetic-core circuits and, more particularly, to improvements therein.

Toroidal magnetic cores of the type wherein there are additional holes in the toroid besides the main center hole have been found to have some extremely useful properties. Amongst these are the ability to provide a nondestructive readout, as well as to permit the construction of shift registers using only wire. These cores are known as multiaperture cores and are described, for example, in an article entitled "A High-Speed Logic System Using Magnetic Elements and Connecting Wires Only," by Hewitt D. Crane, in the January 1959 issue of the I.R.E. Proceedings, page 63, and again in an article by Crane and Bennion, entitled "Design and Analysis of MAD Transfer Circuitry," in the Proceedings of the Western Joint Computer Conference, March 1959. In an application by this inventor for a Magnetic Logic Device, filed February 9, 1959, Serial No. 791,995, now U.S. Patent No. 3,083,355 there is described and claimed an arrangement for synthesizing the multiple-aperture magnetic-core circuits with simple single-aperture toroidal cores. The present invention encompasses circuits which can utilize the best features of both the multiaperture cores, as well as the synthetic arrangements for providing logic circuits with unusual advantages.

Accordingly, an object of the present invention is the provision of a novel circuit which combines the best features of hte multiaperture cores, as well as the synthesized multiaperture-core circuits.

Another object of the present invention is the provision of a hybrid magnetic circuit of the general type indicated, which can provide a simplified circuit for the performance of logical operations.

Yet another object of the present invention is the provision of a novel and useful magnetic-core circuit which enables a multiplicity of logical functions to be performed with simplified circuitry.

These and other objects of the invention may be achieved in arrangements wherein the toroidal magnetic core is inductively coupled to a winding which is inductively coupled to a multiaperture core. For achieving different inputs, this winding may be one which passes through the main aperture of the multiaperture core, or through the input aperture of the multiaperture core with a coupling sense which can be varied to provide either a positive or negative input to the multiaperture core. This winding may also be an output winding on the multiaperture core, coupled to the main aperture of the multiaperture core for obtaining a positive or negative output, or coupled to one of the output apertures of the multiaperture core in a manner to obtain a desired output function.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1:
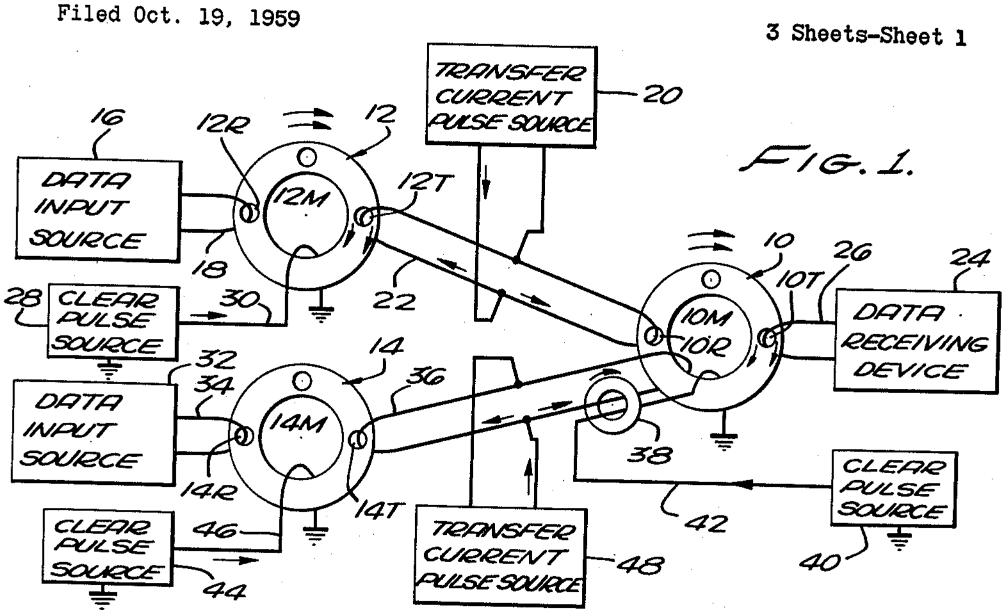
FIGURE 1 is a schematic drawing of an embodiment of the invention illustrating one type of input in a combined synthetic-multiaperture magnetic array.

Reference is now made to FIGURE 1, which is a schematic drawing showing an input arrangement which comprises one embodiment of the invention. The multiaperture core 10, comprising as is well known a main aperture 10M and peripheral or terminal apertures including a receiving aperture 10R and a transmitting aperture 10T, will have applied thereto one input in the conventional manner through its receiving aperture 10R and/or a second input through its main aperture 10M, in accordance with this invention. By way of illustration, the inputs applied to the multiaperture core 10 are indicated as being provided by two other multiaperture cores 12 and 14. This, it should be understood, is by way of illustration of the operation of the invention, and is not to be construed as a limitation thereon.

For the purposes of illustrating the conventional input to the multiaperture core 10, a data-input source 16 which is coupled through an input winding 18 to the receive aperture 12R of the multiaperture core 12, can drive the core 12 to its set state or leave it in its clear state, depending upon whether or not a one or a zero is to be entered into the core 12. The multiaperture core, in accordance accepted convention, is considered as having two legs; one leg, the outer leg, comprises the magnetic material in the ring between the small apertures and the outer periphery of the toroid, and the second leg, or inner leg, is between the small apertures and the main aperture of the toroid. In the clear, or zero, state flux is considered to circulate in a clockwise direction, as represented in the drawing by the arrows above the core in both legs. When a "one" is sought to be stored in the core, a current pulse must be applied from the data-input source, which exceeds a critical amplitude which is sufficient to insure the reversal of flux in a path around the main aperture, which effectively passes between the aperture 12R and the outer periphery of the core, and then around the main aperture of the core 12.

This provides a flux condition in the material immediately surrounding the transmit aperture 21T, wherein the flux in the outer leg is in a clockwise direction and the flux in the inner leg is in a counterclockwise direction, with regard to the main aperture. When the core 12 is in its clear state, as previously indicated, the flux about the transmit aperture 12T is all in a clockwise direction with regard to the main aperture, as illustrated by the arrows in the drawing.

A transfer-current pulse source 20 is connected to the center points of opposite sides of a transfer winding 22, which couples the transmit aperture 12T to the receive aperture 10R of the respective cores 12 and 10. The transfer-current pulse source is actuated to apply a current having a value of twice a threshold value to the transfer winding 22. This threshold value is that which is just insufficient to switch flux about the main aperture of the type of multiaperture core being used. This current, which flows in the direction represented by the arrows, tends to divide equally in half between the two halves of the transfer winding 22. With the core 12 in the clear state, this current is unable to switch flux about the transmit aperture, since the flux in part of this path is already in the direction in which the current seeks to cause it to switch. Also, this current is insufficient to cause switching about the main aperture 12M. Since the current passing through the receive aperture 10R is insufficient to switch flux around the main aperture 10M, the core 10 will remain substantially unaffected and in its clear state, storing a zero, which is the same data bit which was stored in the core 12.

If the core 12 had been driven to its set state by the data-input source, in response to which the flux state about the transmit aperture 12T was altered, then the pulse of current from the transfer-current pulse source could provide more than a sufficient amount of current at the transmit aperture 12T to cause the flux about this aperture to be reversed. This flux reversal induces a voltage in the transfer winding 12, the effect of which is to cause more than the normal half of the current flowing from the transfer-current pulse source to be steered into the half of the winding 22 coupled to the receive aperture 10R. Since the value of the current from the transfer-current pulse source is twice the threshold value required for switching the flux about the main aperture, a sufficient value of current is provided to the receive aperture 10R to cause the switch of flux about the main aperture of the core 10, whereupon it is driven to its set state, or "one" storing condition. This data can be read out from the transmit aperture 10T by the data-receiving device 24. The data-receiving device is coupled to the transmit aperture 10T by a winding 26 and can read the data from the core 10 in the same manner as has been described for transferring out data from the core 12. The core 12 can be returned to its clear state by a pulse derived from a clear-pulse source 28 and which is applied to a clear winding 30, coupled to the core 12 through its main aperture. In being returned to its clear state, the core 12, if previously set, does induce a voltage into the transfer winding 22. However, the resulting current flow can only cause a flux reversal around the receiving aperture 10R, which does not affect the state of the flux around the transmit aperture 10T and, as a consequence, does not disturb the data which has been stored in the multiaperture core 10.

The brief description thus far of the mechanics of the multiaperture-core storage and transfer of data, is known and described in the prior art, for example, in the previously mentioned articles. In accordance with this invention, data can be entered into the multiaperture core 10 from preceding data sources via the main aperture 10M. The problem presented when data is sought to be introduced into a multiaperture core by a winding through its main aperture is that of maintaining the multiaperture core isolated against the effects of currents which are induced in this winding by the operation other than the introduction of data causing such currents. These operations may be, for example, that of clearing a preceding core, which without the proper precautions can effectuate a false data entry or alteration of the data previously stored in the core 10.

As indicated, the core 14 will serve to exemplify a data-input source for the core 10. The core 14 is driven from a data-input source 32, which is coupled to the receive aperture 14R of core 14 through an input winding 34. A transmit winding 36 is coupled to the transmit aperture 14T of the core 14, and also passes through the aperture of a toroidal core 38 and through the main aperture of the core 10. The core 38, as well as the core 10, are driven to their clear states, which is indicated by the flux representative arrows circulating in the clockwise direction, by a current pulse derived from a clear-pulse source 40 and applied to a clear winding 42. The clear winding 42 is inductively coupled to the core 38 and the core 10 in a manner to drive both to the clear state, so that the flux contained in each core will be in a clockwise direction. Core 14 can also be driven to its clear state by a current pulse obtained from the clear-pulse source 44 and applied to the clear winding 46, coupled to the core 14 by way of its main aperture 14M.

Assume now that the data-input source 32 has stored a bit of binary information to the core 14 in the manner previously described for the core 12 in connection with its data-input source 16. Assume at first that this bit of data is a zero, then the core 14 remains essentially in its clear state. The excitation of the transfer winding 36 by current from the transfer-current pulse source 48 coupled to the transfer winding results in no change, since the current which will flow in each branch of the transfer winding 36 will be at the threshold value, which is insufficient to cause a reversal of flux around the main aperture of either cores 14 or 10. As far as the core 38 is concerned, the current flow is in a direction which tends to drive it further in the state of saturation in which it has already been placed by the clear pulse. Thus, the core 10 remains substantially in its clear state when the core 14 has had a zero entered thereinto.

Assume now that the data-input source has entered a one into the core 14 . The current from the transfer-current pulse source 48 can then start a flux reversal around the aperture 14T, whereupon the remaining current being supplied from the transfer-current pulse source will be steered toward the half of the winding 36, which threads the main aperture 10M and the aperture of core 38. Core 38 will remain unaffected since this current, although greater in value than the current existing in the presence of a zero in the core 14, will only tend to drive the core 38 further into saturation in the state in which it has already been placed. However, the current exceeds the value required to cause a flux reversal around the main aperture of hte core 10. As for the transmitting aperture 10T, the state of flux adjacent thereto is identical with the state of flux provided when current applied to the winding coupled to the received aperture drives the core 10 to its set state. Therefore, a one may be read out of the core 10 by a current applied to the winding 26, coupled to the transmit aperture 10T identically with the situation existing when a one has been entered into the core 10 through its receive aperture.

It is desired at this time to clear the core 14 for the purpose of receiving new data. As indicated previously, the clear-pulse source 44 applies a sufficient current to the winding 46 to clear the core 14. This induces a current in the transfer winding 36, which flows in a direction opposite to the current flow received from the transfer-current pulse source 48. Without the presence of the core 38, this current would cause a flux disturbance in the core 10 around its main aperture with the result that either a false bit of data is entered into the core 10 or the data already there may be rendered false. However, core 38, either due to size or the selection of material, or turns ratio, presents a lower switching threshold than core 10, and the current now flowing in the transfer winding 36 will drive the core 38 to saturation in the direction opposite to the one to which it is cleared. Thereby, the flux linkages which would otherwise drive the core 10 are absorbed by the core 38. Core 10 is isolated by core 38 from the effects of current or disturbances other than the desired drive currents.

Figure 2:
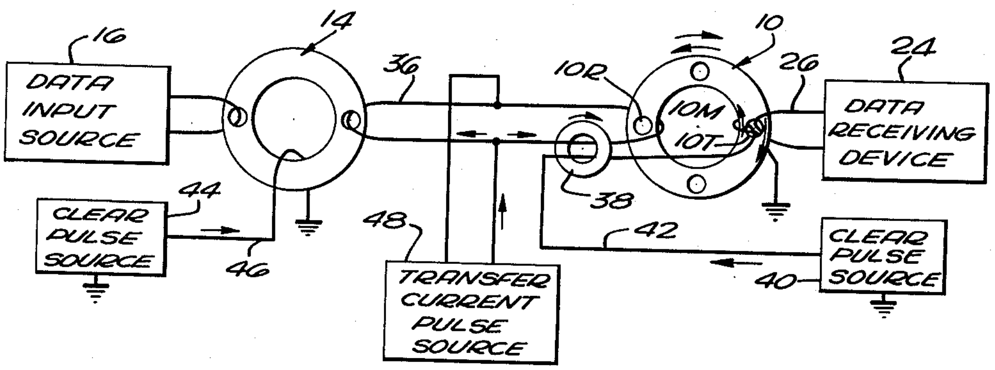
FIGURE 2 is a schematic drawing of an embodiment of the invention illustrating another type of input in a combined synthetic-multiaperture array.

FIGURE 2 is a schematic diagram illustrating another type of input embodying the invention. In FIGURE 2, the core 12 and its associated wiring have been omitted in the interests of preserving clarity in the drawing. The cores 10 and 14 and their associated apparatus have been shown, however. The distinction between FIGURES 1 and 2 is that the transfer winding 36 in FIGURE 2 is coupled to the core 10 with a sense opposite to the one shown in FIGURE 1. Further, the clear winding 42 is coupled to the core 10 through a terminal aperture 10T, instead of through the main aperture 10M. When a clear current pulse from the source 40 is applied to the winding 42, the core 38 is driven to saturation in the same state as the core 38 in FIGURE 1. However, the core 10 is driven to its set state, rather than the clear state shown in FIGURE 1. That is, the flux around the outer leg is in a clockwise direction, and the flux around the inner leg is in a counterclockwise direction. With this arrangement, the data-receiving device 24 can derive the complement of the data which has been applied to the core 10.

If the core 14 has had a zero entered thereinto, then, upon the application of a transfer current from the pulse source 48 to the transfer winding 36, no effect is had upon the core 10. When its output-transfer winding 26 is excited, then a "one" bit of data is read out of the core 10 into the data-receiving device 24, since the state of the flux around the transmitting aperture 10T is the same as occurs when the core is driven to its set state.

Should core 14 have a "one" binary bit entered thereinto, then, upon the application of current from the pulse source 48 to the transfer winding 36, the voltage induced in the winding 36 steers the greater part of the current from the pulse source 48 through the half of the winding passing through the aperture 10M. This results in a flux reversal around the inner leg of the core 10. Such flux reversal places the core 10 in a state which is considered the clear state. As a result, upon excitation of the winding 26, a zero is read out from the core 10. Thus, the arrangement shown in FIGURE 2 is one for obtaining a complementary readout. The core 38 serves the function of isolating the core 10 against the effects of disturbances or clear currents which are induced in the transfer winding 36.

Figure 3:
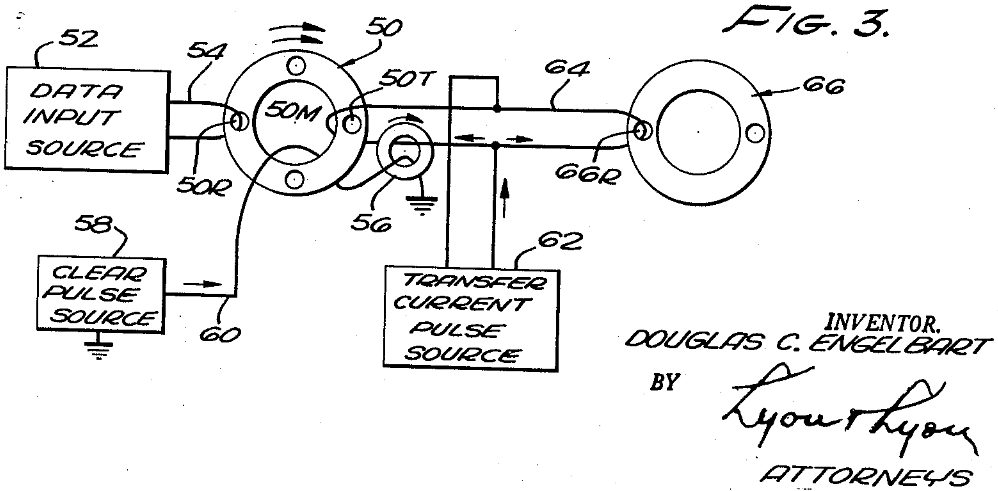
FIGURES 3 and 4 are schematic drawings of embodiments of the invention illustrating types of output arrangements for a synthetic-multiaperture core array.

FIGURE 3 is a schematic drawing of an embodiment of the invention illustrating how a positive output can be derived from a multiaperture core without employing one of the terminal apertures. A multiaperture core 50 has data entered thereinto from a data-input source 52, which is coupled by an input winding 54 to the receive aperture 50R of the core 50. Besides output being derived from the core 50 in the usual manner from the transmitting aperture 50T (not shown, for drawing clarity), in accordance with this invention output can be derived from the core without employing one of the terminal apertures. This is done effectively by employing an extra core 56, which, as will be described, serves the function of storing the same data as the core 50 and, when a readout is desired, provides an output indicative of the data stored in the core 50 without affecting the flux conditions of the core 50.

Initially assume that a clear pulse source 58 has applied current to its associated winding 60. The clear winding 60 is coupled to the main aperture 50M of the core 50 and to the aperture of the extra core 56 with a sense so that these cores will be cleared, with flux considered to circulate in a clockwise direction. Assume initially that the data-input source effectively transfers a zero bit into the core 50. It will be recalled that this means that the core 50 remains in its clear state. A transfer current from a source 62 is applied to the midpoint of a transfer winding 64. The value of this transfer current is twice a critical value. This critical value is just less than the value of current required for causing a flux reversal around the main aperture of core 50, as well as core 66. Half of this current tends to circulate through the transfer winding which couples the main aperture of the core 50 and the main aperture of the core 56. The other half of this current tends to flow through the portion of the transfer winding which is coupled to the receive aperture 66R of the core 66. Core 66 is shown to exemplify a data-receiving source or data sink. The current applied to the transfer winding 64 flows in a direction through the core 56 to establish flux in this core in the same direction as has already been established by the clear winding. Also, this current, passing through aperture 50M, is insufficient to switch any flux about this main aperture. Thus, cores 50 and 56 are left unaffected. Therefore, the core 66 will also be left substantially unaffected by the current flowing through its receive aperture 66R.

To set a one into core 50, it is required that the current from the data-input source 52, which drives the core 50 to its set state, have a sufficient amplitude to drive both cores 50 and 56 to their set states. The flux reversal, which takes place about the main aperture, or inner leg of the core 50, when it is driven to its set state, induces a voltage in the transfer winding 64. This voltage could cause a suffiicent current to flow to set the core 66, were it not for the presence of the core 56, which is designed to present a lower switching threshold to loop 64 than does core 66. The core 56 switches instead, and absorbs the flux linkages which would otherwise set the core 66. Thus, it will be appreciated that both the core 50 and the core 56 are switched to their set conditions.

The switching threshold of core 56 is designed to be substantially less than that seen by loop 64 for cores 50 and 66, and so the portion of the current from source 62 which tends to flow through core 56 is more than sufficient to switch core 56 back toward its cleared state. In the course of this switching, enough of the current from the source 62 is steered through the receive aperture 66R to drive the core 66 to its set condition.

The cores 50 and 56 are cleared prior to the next entry from the data-input source 52. It should be noted, however, that by the use of this invention an output has been derived representative of the data stored in the core 50 without using any one of the terminal apertures therein, or without disturbing the state of the core 50. The core 66 may be subsequently cleared or buffered with an extra core in the manner shown in FIGURE 1.

Figure 4:
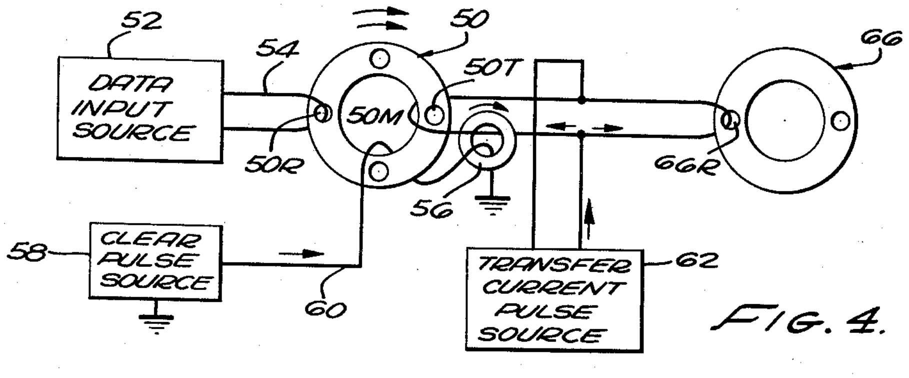

The circuit arrangement shown in FIGURE 4 is substantially identical with that shown in FIGURE 3, and the identical reference numerals are applied to similar functioning parts. The distinction between the two is that the transfer winding 64 is coupled with a reversed sense to the cores 50 and 56 than is shown in FIGURE 3. This enables an output to be derived which is complementary to the input received from the data-input source. Assume first that the input from the data-input source is a zero bit of data, and that therefore the cores 50 and 56 are left substantially in the clear condition. The application of a transfer current from the transfer-current pulse source 62 to the winding 64 causes a current flow through the main aperture of the core 56 of polarity and amplitude sufficient to switch the core to its counterclockwise state. As a result, there is induced in the winding 64 a voltage which operates to steer current from the transfer-current pulse source through the receive aperture 66R of the core 66. The amplitude of this current is sufficient to set the core 66. The core 50 is unaffected by the transfer current at this time, since it flows in a direction to drive the core 50 toward saturation wherein it is already set.

Assume now that the data-input source applies a one bit to the core 50, whereby it is driven to its set state. When this happens, a current is induced in the winding 64, which, because of the sense of the respective windings, tends to drive core 66 further in its already saturated direction, and tends to switch core 56 to the counterclockwise state. Core 56 is designed to saturate in this direction by the time core 50 is fully set. Upon the application of a transfer-current pulse from the source 62 to the winding 64, none of the cores 50, 56, and 66 is switched. Core 56 is already saturated in the direction which transfer current tries to switch it, and currents through cores 50 and 66 are of values insufficient to cause switching. Therefore, a zero state is transferred to core 66.

We see therefore that the current from the transfer-current pulse source will not switch core 56 when a one or set condition has been inserted into the core 50, since the core 56 thereby is already saturated in the counter-clockwise state, and current from the transfer-current pulse source tends only to drive it further into the saturation condition in which the core already has been set. Also, since the value of this current is less than that required to reverse the flux on the inner leg of core 50, this core is substantially unaffected. It should therefore be apparent that the operation of the system is such that, upon application of transfer current from source 62, core 56 (and therefore core 66) will switch only when core 50 has been left in its clear condition and will not switch when core 50 has been transferred to its set condition. Core 66, therefore, is driven to store the complement of the data bit which has been inserted from the input source into the core 50. It is also noteworthy that the condition of core 50 truly reflects the data input, and this can be read out from any one of the output apertures. It is thus possible to obtain the complement of information without going to complicated shapes in the multiaperture device. The synthetic inputs and outputs which have been described thus far can be used in any combination with each other, or with conventional multiaperture inputs and outputs. In the arrangement shown in FIGURE 2, where the initial state of the multiaperture device is different from the normal case, conventional multiaperture inputs are ineffective in changing the initial state, and so, as will be discussed later herein, special consideration must be given to rearranging the scheme of FIGURE 2 with those of FIGURES 1, 3, and 4.

Figure 5:
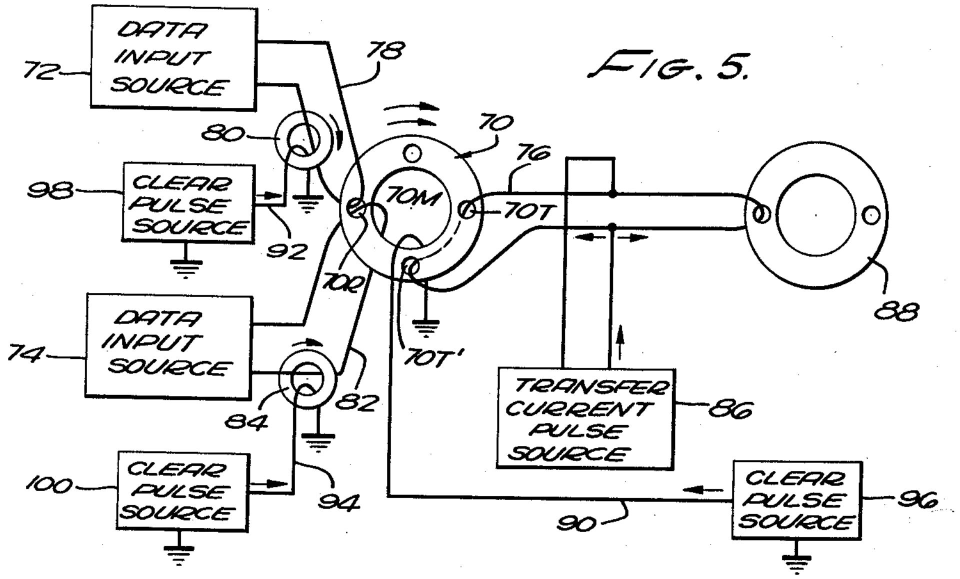
FIGURES 5 and 6 are schematic drawings illustrating the use of an embodiment of the invention for obtaining an "exclusive-or" function.

FIGURE 5 shows an embodiment of the invention, comprising a circuit diagram for obtaining an "exclusive-or" function. By this is meant that a device comprising the core 70 has inputs from two data-input sources, respectively 72, 74, and a single output, or transfer winding 76. The transfer winding will provide a one output only when one or the other of the two data-input sources transfer a one into the core 70. When both data-input sources attempt to transfer a one or when neither of the data-input sources provides a one (equivalent to providing zero), then no output is derived by employing the transfer winding 76. Calling the inputs 72, 74 respectively X and Y, in logical algebra the conditions for a one output transfer may be expressed as $(x\bar{y}+\bar{x}y)$. The data-input source 72 is coupled to the receive aperture 70R by an input winding 78. A first extra core 80 also is inductively coupled to the input winding 78 for the purpose of isolating the core 70 from reverse currents, which may be caused to flow in the winding 78 due to the incidental operation of the data-input source 72. The second data-input source has an input winding 80, which also passes through the receive aperture 70R, but in addition also passes through the main aperture 70M. The extra core 84 is provided which serves the function as described for FIGURES 1 and 2 of isolating the core 70 from effects incidental to the operation of the data-input source 74. The transfer winding 76 is coupled to the core 70 by being passed through first and second transmit apertures 70T and 70T'. A transfer-current source 86 is employed to apply current to the transfer winding 76 in order to derive an output from core 70 and apply it to the output-data core 88.

The core 70, as well as the cores 80 and 84, are all set to their clear states by current respectively applied to the clear windings 90, 92, 94 from the clear-pulse sources 96, 98, 100. It may be preferred to use one clear pulse source in place of the three shown. The clear states are representative in a conventional manner by flux circulating in a clockwise direction. Assuming now that neither data-input source has been excited, or that the data-input sources 72, 74 enter zero bits into the core 70, then the flux therein remains in the clockwise direction. Current of the usual value from the transfer-current source 86 applied to the output winding 76 cannot reverse flux about the apertures 70T, 70T', since the state of the flux in the core 70 is such as to require a greater current than the value provided from the transfer-current source to achieve flux switching. Should both data-input sources have been operated to enter ones into the core 70, then the flux in both legs of the core would be reversed. The same condition prevails when a current is applied from the transfer-current source to the winding 76 as is present when the core is in its clear state. The flux conditions in the core require a greater current value than that provided from the transfer-current source.

Should only one data-input source enter a one or set the core 70, then flux reversal occurs in one or the other of the two legs of the core, depending upon which data-input source was excited. If data-input source 72 was excited, then the flux is reversed about the main aperture in a path which includes the magnetic material between the aperture 70R and the outside of the core, and the magnetic material between the aperture 70T and the inside of the core. If only data-input source 74 transfers a one into the core 70, then essentially the only difference is that flux reversal occurs in the inner leg at 70R rather than the outer leg. However, in either event subsequent current from the transfer-current source would be sufficient to switch the flux about the apertures 70T and 70T', which results in a voltage being induced in the winding 76, causing the transfer current to flow through the aperture of the core 88, causing it to receive a one.

Figure 6:
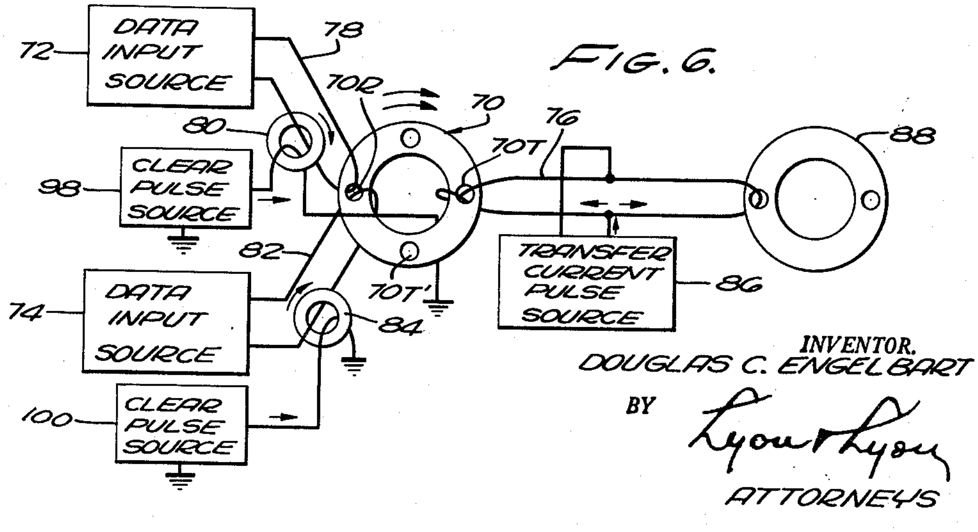

It can be shown that the characteristics required of the output winding for the array shown in FIGURE 5 can be achieved in another fashion. This requires that the entire core can have its flux reversed without any net flux linkages being switched in the output windings. FIGURE 6 is a circuit diagram of an alternative arrangement for the exclusive-or shown in FIGURE 5. The input to the core 70 is identical with that shown in FIGURE 5. However, the output winding 76 forms a figure-eight to thread through the transmit aperture 70T, then through the main aperture 70M, then again through the transmit aperture 70T, and thereafter to the data-output receiving devices. When flux is reversed about the main aperture of the multiaperture core, any tendency for more flux to switch in the one of the legs, then the other, is countered by small circulating currents in the output loop, which reacts back on the multiaperture core 70 to force an equal splitting of a switching flux between the inner and outer legs. As a result, the entire core can have its flux reversed with continuously equal distribution of switching flux between the inner and outer legs in such a fashion that no net flux-linkage change appears in the output windings.

At the time that half of the flux around the main aperture has been switched, as it would be if one or the other but not both of the inputs has received a one, it will be found that current of either sense in the output windings can cause one-half of flux in each leg to reverse. The flux reversing in each leg is coupled by the output windings, and the net flux-linkage change is equivalent to a complete, full leg of flux through one turn. This provides a normal measure of flux linkages switchable by the output windings and can represent a full one transfer. It should be noted that if the inputs are energized sequentially, instead of simultaneously, the result is the logical function, OR.

It should be further noted that the multiple inputs can be utilized with a multiaperture device for which one of the input apertures has the exclusive-or type of input which is shown in FIGURE 6. A requirement is established that the other inputs either be this same type of "exclusive-or" function, or with an input winding of the figure-eight type, or a synthetic type of input. There is also the option of providing more than one output from the multiaperture device, as previously shown. For instance, two of the apertures can be used for "exclusive-or" inputs and two of the apertures for outputs.

Figure 7:
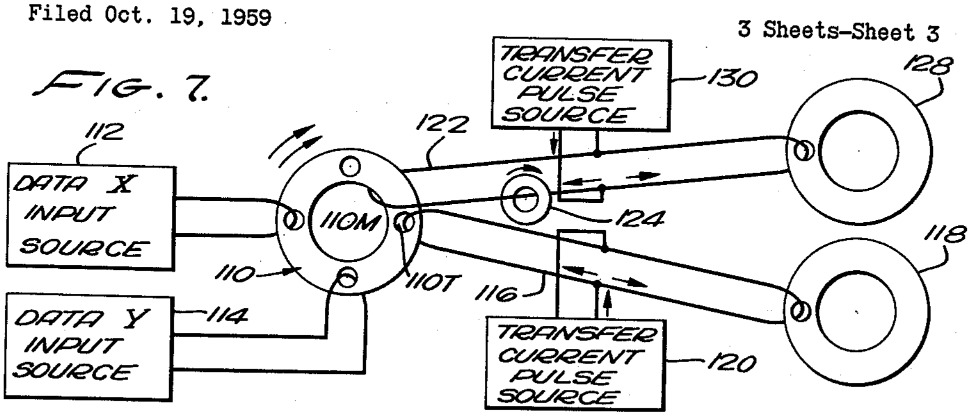
FIGURE 7 is a schematic drawing illustrating the use of an embodiment of the invention for obtaining an "or" function, or its complement, a "nor" function.

Referring now to FIGURE 7, there is shown a circuit diagram comprising a two-input logic array whose normal multiaperture output gives an OR function, namely, an indication of an input from either one of the two data-input sources, and whose complementary synthetic output provides a NOR function. By the NOR function is meant that an output is derived when no input has been received from either of the data-input sources. Thus, the NOR function may be stated $[(\overline{x+y})=\overline{x}\overline{y}]$. The multiaperture core 110 has data inserted therein in the usual manner from a first, "X," data-input source 112, or from a second, "Y," data-input source 114. Output is derived from the transmit aperture of the core 110T in the usual manner, employing a transfer winding 116, which is coupled to a succeeding core 118. The transfer is effectuated by employing a transfer-current pulse source 120, which operates in the usual manner also. As described thus far, an input from either one of the data sources 112, 114 will insure that core 110 is in a set state if the input is a one, and will leave undisturbed the information in core 110 if the input is a zero. The output derived from aperture 110T provides the OR function, namely, indicates whether or not a one input has been received from either data source 112 or data source 114, or both.

By coupling circuitry for deriving a complementary synthetic output of the type shown and described in FIGURE 4, to the core 110, a NOR function is achieved. That is, the synthetic output will provide a one output when there has not been a one introduced from either data-input source 112 or data-input source 114. The operation of the additional circuitry is identical with that described previously for FIGURE 4.

A tranfser winding 122 is coupled to the core 110 through its main aperture 110M through an auxiliary core 124 and through the receive aperture of a core 128. The sense of the coupling is such that when the core 110 is set by receiving an input from either of the data-input-sources 112, 114, a current is induced in the transfer winding 122 which will drive the core 124 to saturation with its flux circulating in a counterclockwise direction. Otherwise, the core 124 is cleared to a flux saturation condition with its flux circulating in the clockwise direction. Assuming that core 110 is maintained in its clear state, then upon the application of current to the winding 122 from the transfer-current pulse source 130, having a value sufficient to drive the core 124 to saturation in the condition opposite to its clear state but not to affect the flux about the main aperture of the core 110, core 124 is driven and steers sufficient current from the transfer-current pulse source 130 through the receive aperture of the core 128 to set that core. Assuming that the core 110 has been driven to its one state, or set condition, by an input from either of the data-input sources, then core 124 will be likewise driven to its set state with the flux therein circulating in a counterclockwise direction. As a result, the current from the transfer-current pulse source will not drive the core 124, and as a result the amplitude of the current passing through the receive aperture of the core 128 will be insufficient to set that core. Thus, the transfer winding 122, when excited, provides an input to the core 128, which is complementary to the input provided the core 118.

Figure 8:
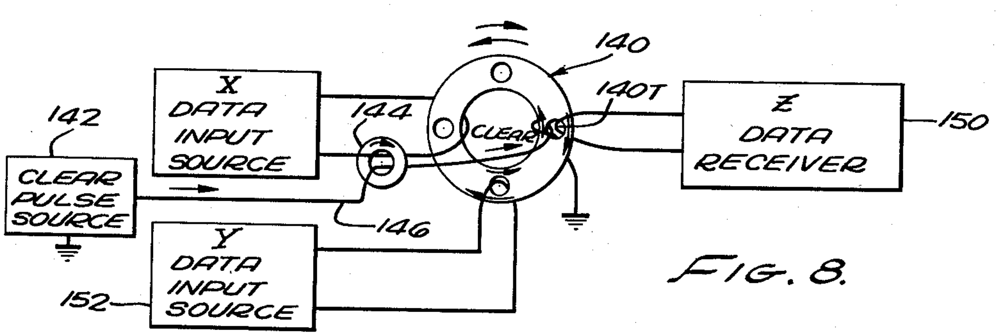
FIGURES 8 and 9 are schematic drawings illustrating the use of an embodiment of the invention for obtaining other logical functions.

FIGURE 8 is a circuit diagram illustrating the use of an input such as is shown and described for FIGURE 2, together with a conventional input for obtaining a logical function, which may be expressed as follows: output $z=(\overline{x}+y)$. The multiaperture core 140 is initially placed by a clear pulse from the source 142 in what is normally considered at a set state, similar to the core 10 in FIGURE 2. Also, core 144, which is linked to the clear winding 146, is set in its clear state with the flux circulating in a clockwise direction. Assume an input from the X-data-input source 148 which operates in the manner described for FIGURE 2, to the core 140. Core 140 will be driven to its clear condition. Thereafter, the core 140 can receive data from the Y-data-input source 152 in a manner normal for multiaperture cores. The Z-data-sink 150 is coupled to the transmit aperture 140T and derives or senses the information in the core 140 in the manner customary for multiaperture cores. With the arrangement described in FIGURE 8, by requiring that the X-data-input source be operated before the Y-data-input source, it is possible to sense an input from the X-data source followed by a positive input from the Y-data source.

Figure 9:
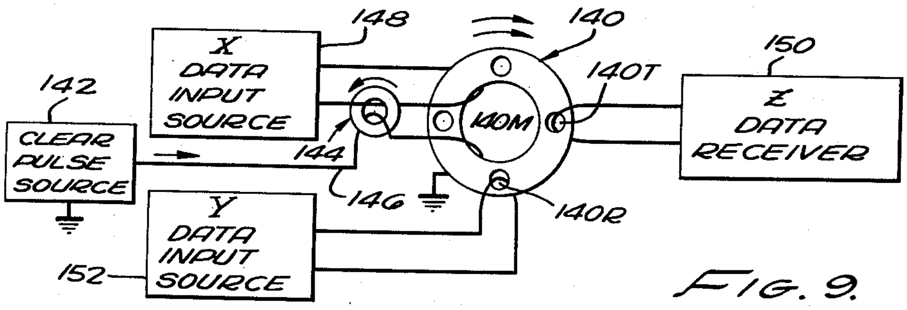

FIGURE 9 illustrates a circuit arrangement wherein the normal multiaperture core input is combined with the complementary, or negative, type of input shown in FIGURE 2, to provide an arrangement for sensing the occurrence of inputs from both sources. Expressed in logical algebra, this represents the function $z=y\overline{x}$. The X-data-input source 148 is coupled to the magnetic core 140 in the manner described in FIGURE 2. The Y-data-input source 152 is coupled to an input aperture 140R of the core 140. The Z-data receiver 150 is coupled to the transmit aperture 140T of the core 140. A clear-pulse source 142 clears core 144 as well as core 140. With the requirement that an input from the Y-data-input source 152 be made to occur first, the operation for the system is as follows. Core 140 is first cleared to the usual state with flux in both legs circulating in a clockwise direction. Upon a one input being received from the Y-data-input source, flux is reversed about the main aperture 140M in a path which includes the outer leg at the aperture 140R and the inner leg at aperture 140T. This action causes core 144 to switch to its clockwise state. Thereafter, an input from the X-data-input source, if it occurs, can restore core 140 to its clear state. The absence of this input enables the Z-data receiver 150 to derive a one output from the core 140.

Designating the type of input shown in FIGURE 1 as a plus input and the type of input shown in FIGURE 2 as a minus input, a plurality of these plus and minus inputs can be coupled to a multiaperture core and can be energized in a sequence to provide a considerable variation of a different logical operation.

Figure 10:
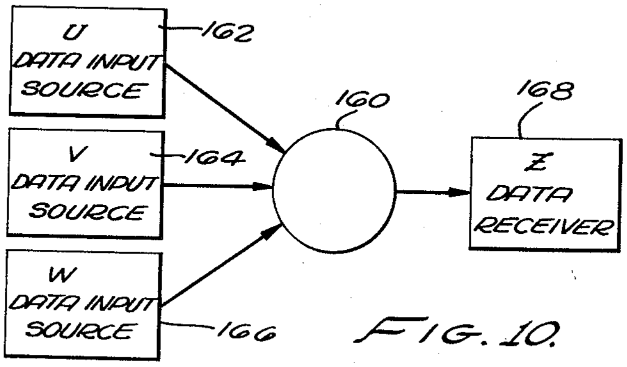
FIGURE 10 is a symbolic diagram shown to assist in an understanding of the various logic schemes possible with this invention.

FIGURE 10 is a symbolic diagram shown to assist in an understanding of the various logic schemes possible with this invention. The circle 160 represents a magnetic core which may have multiapertures. Three data sources 162, 164, 166 are respectively representative of U, V, and W data-input sources. A data sink is designated as the Z-data receiver 168. Consider now the embodiment of the invention described in FIGURE 1 as a plus input and the embodiment of the invention described in FIGURE 2 as a minus input, and, further, consider the sequence of U, V, W as the order in which the respective data-input sources are energized. There can then be drawn a table, such as the one shown below, which illustrates for each combination of plus and minus inputs the resultant logical functions developed:

| U | V | W | Z(u,v,w) |
|---|---|---|---|
| + | + | + | $u+v+w$ |
| + | + | − | $(u+v)\overline{w}$ |
| + | − | + | $u\overline{v}+w$ |
| + | − | − | $u\overline{vw}$ |
| − | + | + | $\overline{u}+v+w$ |
| − | + | − | $(\overline{u}+v)\overline{w}$ |
| − | − | + | $\overline{uv}+w$ |
| − | − | − | $\overline{uvw}$ |

There has accordingly been shown herein a novel, useful arrangement for combining synthetic inputs and outputs in accordance with this invention with multiaperture cores to provide unique and simplified structure for obtaining logical functions.

I claim:

1. In combination a source of data providing an output alternately comprising data pulses and noise pulses, a multiaperture core made of magnetic material having two opposite states of stable magnetic remanence and having a substantially toroidal shape with a central main aperture and transmit and receive apertures in said toroidal ring, a magnetic toroidal core having a central aperture and two opposite stable states of magnetic remanence, and a lower coercivity than said multiaperture core, and winding means coupling said source of data with said toroidal core and said multiaperture core with a sense to permit only said data pulses to affect the state of remanence of said multiaperture core and only said noise pulses to affect the state of remanence of said toroidal core.

2. Apparatus for entering data from a data source including a data source magnetic core into a multiaperture magnetic core of the type having two opposite states of stable magnetic remanence and having a substantially toroidal shape with a central main aperture, and transmit and receive apertures in said toroid, said apparatus including a magnetic toroidal core having a central aperture, two opposite stable states of magnetic remanence, and a lower coercivity than said multiaperture core, and a winding coupling said data source magnetic core to said multiaperture core and to said toroidal core, said winding threading through said multiaperture core main aperture, said toroidal core central aperture and being inductively coupled to both with the same winding sense.

References Cited in the file of this patent

UNITED STATES PATENTS

| | | |
|---|---|---|
| 2,751,509 | Torrey | June 19, 1956 |
| 2,781,503 | Saunders | Feb. 12, 1957 |
| 2,907,987 | Russell | Oct. 6, 1959 |
| 2,910,594 | Bauer et al. | Oct. 27, 1959 |
| 2,911,630 | Dinowitz | Nov. 3, 1959 |
| 2,935,739 | Crane | May 3, 1960 |
| 2,968,795 | Briggs et al. | Jan. 17, 1961 |
| 2,969,524 | Bennion | Jan. 24, 1961 |

OTHER REFERENCES

Publication I: ONYSHKEVICH, Technical Report No. 329, MIT Research Laboratory of Electronics, July 9, 1957.